Patented May 14, 1929.

1,713,127

UNITED STATES PATENT OFFICE.

FRANKLIN GRANT HILLS, OF PUEBLO, COLORADO, ASSIGNOR TO AMERICAN SMELTING AND REFINING COMPANY, OF NEW YORK, N. Y., A CORPORATION OF NEW JERSEY.

DIRECT PRODUCTION OF ARSENIC OXIDE.

No Drawing.   Application filed November 10, 1920.   Serial No. 423,165.

The invention relates in general to an improved metallurgical process for producing arsenious oxide or white arsenic ($As_2O_3$) from arsenic bearing material, such as arsenic ores and other arsenic bearing products. More definitely defined, the invention relates to the recovery of arsenic or of a product containing relatively high percentages of arsenic from material in which the arsenic is present in variable amounts and particularly where the arsenic is present in relatively small proportions.

The invention further relates to the selective separation of certain elements such as arsenic, lead and zinc from ores or other material containing these elements.

It has been a usual practice in the manufacture of arsenic to smelt the arsenical bearing ores in a blast or reverberatory furnace, to recover the fumes discharged from such furnaces and finally to subject the recovered product to a refining operation to place the recovered arsenic in condition for the market. Aside from the expense involved, which obviously is a material factor in the cost of production, one of the primary objects of this invention is to obtain a high grade white arsenic direct from the arsenic containing material and without the necessity of refining the fumes to recover the arsenic, or, at least to avoid the necessity of the usual refining steps except where a product of extremely high purity is desired.

Broadly, I attain this phase of the invention by subjecting the arsenic containing material to a heat treatment in the presence of a reducing agent, if necessary.

Still another object of the invention is to provide a simple, continuous process capable of being practiced extensively on a commercial scale and which in its sequence of steps will economically separate and recover arsenic in commercially pure form when in the presence of lead and zinc and in succeeding periods will recover the lead and zinc as oxides substantially free of the arsenic and in the final periods of the run will obtain lead oxide substantially free of both arsenic and zinc.

I attain this feature of the invention by conducting the operation for the recovery of the arsenic under prescribed temperature conditions for a period of time sufficient to recover practically all of the arsenic, to continue the operation until all of the zinc and a large fraction of the lead has come off and then further to continue the operation until practically all of the lead has been volatilized.

The material which can be utilized for practicing the method herein disclosed may be any of the arsenic ores, metallic arsenic, arsenic trioxide, arsenic pentoxide or any of the arsenic containing by-products. The invention is particularly applicable to these substances which are relatively low in arsenic contents, such as the western Utah ores which run as low as ten percent in arsenic.

As an illustration of one practical method which has been worked successfully a mass of low grade arsenic containing ore was crushed to pass a fourteen mesh screen and fed into a preheated furnace. It is preferable that the furnace have a perforated grate to permit the free passage of air through all portions of the mass of material. The furnace used in the above recited instance was a Wetheril type furnace with a pin hole grate arranged to direct the air, under pressure, from the underside of the grate through the pin holes and through the charge of material the layer of ore on the grate being shallow, as is usual with this type of furnace. It is obviously within the scope of the invention, however, to treat the material in other types of furnaces.

Under the conditions recited with the Wetheril furnace the air was supplied at the rate of about 43 cubic feet per minute per square foot of grate area at a pressure of from $1/8$th to $3/4$ths inch of water, apparently the best results being obtained with the lower pressure. The operation was maintained at a temperature considerably below the temperature present in a smelting furnace, and in the instance recited the temperature in the furnace above the charge was not materially greater than 300° C.

For furnishing the necessary heat and reducing conditions, a suitable combustible material is added such as pulverized bituminous or anthracite coal or coke. Sulphide ore may also be added and under some circumstances has been found to give a better separation of arsenic from the ore.

In materials carrying the arsenic as pentoxide a reducing agent was added. In different instances anthracite coal, coke and sulphide ore was used as reducing agents.

Working under these conditions it is found that about 97% of the arsenic comes off as arsenic trioxide, in a form sufficiently pure for marketable purposes and under these conditions very little other volatile bodies present are discharged. In those cases where lead and zinc were present these two elements came off at less than one per cent of their contents during the initial period while the arsenic was being discharged. In the case illustrated, practically all of the arsenic came off within the first 135 minutes. From this period on for about 80 additional minutes under a slightly increased temperature, or a total of 215 minutes, both zinc and lead oxides came off in the fume at the end of which period practically all of the zinc had been discharged. The process was continued for a further period of about 35 minutes or a total period of 250 minutes at the end of which period practically all of the lead had been discharged.

During the initial period of time while the arsenic was being discharged it was recovered by condensation in a bag-house. It is suggested, however, that the arsenic may be collected in flue chambers, cyclone collectors, or Cottrell plants, or by other known means. The product which first comes off is slightly contaminated presumably due to the presence of carbon but this is soon eliminated and the succeeding product is of a high purity. It is obviously possible by this method to selectively collect a portion of a product of special purity. When treating the arsenic bearing material in thin layers on a perforated grate type of apparatus such as the Wetherill or Dwight-Lloyd, the apparatus is preferably operated in the usual manner, that is, without stirring or rabbling the ore bed. By conducting the operation thus, no fine ore or coal dust is stirred up to be carried off to contaminate the arsenic fumes.

While this disclosure features the production of high grade arsenic trioxide without the necessity of any refining steps, it is obviously within the scope of the disclosure to refine the product obtained by the manner suggested herein whenever a product of higher purity is desired.

Having thus described my invention, I claim:

1. The process of producing arsenious oxide which comprises mixing material containing arsenic in oxidized form with a reducing material which supports combustion, placing the material in a shallow layer on a support pervious to air, and igniting the combustible material and blowing air through the mixture to heat it without substantial disturbance of the charge mixture and cause the reduction and oxidation of the arsenic of the ore to arsenious oxide and to volatilize the arsenious oxide substantially free from dust.

2. The process of producing arsenious oxide which comprises reducing oxidized arsenic ores mixed with a fuel relatively low in volatile hydrocarbon content and at temperatures high enough to produce and volatilize arsenious oxide by burning the fuel in a shallow layer of the mixture by passing currents of air at approximately three quarter inch pressure through the layer, and carrying off the volatilized arsenious oxide from the mixture.

3. Process of producing arsenious oxide from arsenic bearing material which consists in mixing carbonaceous material with the arsenic bearing material, placing the mixture in a shallow layer on a perforated support, igniting the carbonaceous material and causing air currents of low pressure to pass through the layer without disturbing said layer to burn the carbonaceous material and heat the mixture, thereby to cause reduction and oxidation of the arsenic to arsenic trioxide, and collecting the arsenic trioxide as a fume substantially free from dust.

Signed at Pueblo, in the county of Pueblo and State of Colorado this 14th day of October, A. D. 1920.

FRANKLIN GRANT HILLS.